(12) United States Patent
Liu et al.

(10) Patent No.: US 9,912,910 B2
(45) Date of Patent: Mar. 6, 2018

(54) MEDIA CONTENT UPDATING METHOD, APPARATUS, AND SYSTEM

(71) Applicant: Huawei Technologies Co., Ltd., Shenzhen (CN)

(72) Inventors: Yan Liu, Shenzhen (CN); Weiwei Yang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/426,381

(22) Filed: Feb. 7, 2017

(65) Prior Publication Data

US 2017/0150102 A1    May 25, 2017

Related U.S. Application Data

(63) Continuation of application No. PCT/CN2015/085124, filed on Jul. 25, 2015.

(30) Foreign Application Priority Data

Aug. 8, 2014  (CN) .......................... 2014 1 0390021

(51) Int. Cl.
*H04N 7/15* (2006.01)
*A45F 5/02* (2006.01)
(Continued)

(52) U.S. Cl.
CPC ............. *H04N 7/152* (2013.01); *A42B 3/042* (2013.01); *A42B 3/0406* (2013.01); *A45F 5/02* (2013.01); *F16M 13/04* (2013.01); *G02B 23/125* (2013.01)

(58) Field of Classification Search
None
See application file for complete search history.

(56) References Cited

U.S. PATENT DOCUMENTS

2004/0060067 A1* 3/2004 Yi ..................... H04L 29/06027
                                                        725/105
2009/0164575 A1   6/2009 Barbeau et al.
(Continued)

FOREIGN PATENT DOCUMENTS

CN   101582908 A   11/2009
CN   102843542 A   12/2012

OTHER PUBLICATIONS

Machine Translation and Abstract of Chinese Publication No. CN101582908, dated Nov. 18, 2009, 16 pages.
(Continued)

*Primary Examiner* — Creighton Smith
(74) *Attorney, Agent, or Firm* — Slater Matsil, LLP

(57) ABSTRACT

A media content updating method is presented, wherein the method is performed by a media transmit end, including obtaining a changed media object attribute on a side of the media transmit end; determining an updating operation instruction for the changed media object attribute according to a change type of the changed media object attribute; and sending a first announcement message to a media receive end, where the first announcement message includes the updating operation instruction and the changed media object attribute, so that the media receive end updates, according to the updating operation instruction and the changed media object attribute, media content that is on the side of the media transmit end and that is stored on a side of the media receive end. In embodiments of the present disclosure, an announcement message carries a changed media object attribute, so that a bandwidth occupancy rate can be reduced.

17 Claims, 8 Drawing Sheets

(51) Int. Cl.
  *G02B 23/12*  (2006.01)
  *F16M 13/04*  (2006.01)
  *A42B 3/04*  (2006.01)

(56) References Cited

U.S. PATENT DOCUMENTS

2013/0160072 A1* 6/2013 Reus .................... G06F 21/604
                                                          726/1
2017/0251241 A1* 8/2017 Baratz ................ H04N 21/4335

OTHER PUBLICATIONS

Foreign Communication From a Counterpart Application, PCT Application No. PCT/CN2015/085124, English Translation of International Search Report dated Nov. 3, 2015, 2 pages.
Foreign Communication From a Counterpart Application, PCT Application No. PCT/CN2015/085124, English Translation of Written Opinion dated Nov. 3, 2015, 6 pages.

* cited by examiner

MEDIA CONTENT UPDATING METHOD,
APPARATUS, AND SYSTEM

CROSS-REFERENCE TO RELATED APPLICATIONS

This application is a continuation of International Application No. PCT/CN2015/085124, filed on Jul. 25, 2015, which claims priority to Chinese Patent Application No. 201410390021.9, filed on Aug. 8, 2014, both of which are hereby incorporated by reference in their entireties.

TECHNICAL FIELD

The present disclosure relates to the field of multimedia technologies, and in particular, to a media content updating method, apparatus, and system.

BACKGROUND

With development of videoconferencing and various intelligent terminals, in a conference, a device for conference participants develops from a conventional display with one camera, one live video, and one live image to a display with multiple cameras, multiple live videos, and multiple live images; and an intelligent terminal also develops from a conventional intelligent terminal with no camera to an intelligent terminal with multiple cameras. It can be learned that conventional point-to-point communication or multi-point communication is changing from a single audio/video stream to multiple audio/video streams.

To help each participant in multi-stream communication select media content from multiple angles, a media transmit end sends an announcement message to a media receive end, and the announcement message includes all media content on a side of the media receive end. The media receive end updates media content on the side of the media receive end according to the media content in the announcement message. In this manner of media content transmission between the media transmit end and the media receive end in the prior art, a large amount of bandwidth is wasted.

SUMMARY

To resolve a problem in the prior art that bandwidth is wasted during media content updating, embodiments of the present disclosure provide a media content updating method, in which only a changed media object attribute is sent, so that bandwidth may be saved. The embodiments of the present disclosure further provide a corresponding apparatus and system.

A first aspect of the present disclosure provides a media content updating method, including obtaining, by a media transmit end, a changed media object attribute on a side of the media transmit end, where the media object attribute is included in a media object, and the media object is included in media content; determining, by the media transmit end, an updating operation instruction for the changed media object attribute according to a change type of the changed media object attribute; and sending, by the media transmit end, a first announcement message to a media receive end, where the first announcement message includes the updating operation instruction and the changed media object attribute, so that the media receive end updates, according to the updating operation instruction and the changed media object attribute, media content that is on the side of the media transmit end and that is stored on a side of the media receive end.

With reference to the first aspect, in a first possible implementation manner, before the sending, by the media transmit end, a first announcement message to a media receive end, the method further includes sending, by the media transmit end, a second announcement message to the media receive end, where the second announcement message carries all media content on the side of the media transmit end, so that the media receive end stores all the media content on the side of the media transmit end.

With reference to the first aspect or the first possible implementation manner of the first aspect, in a second possible implementation manner, before the sending, by the media transmit end, a first announcement message to a media receive end, the method further includes determining a change amount of the changed media object attribute relative to changed media content on the side of the media transmit end, where the media content on the side of the media transmit end includes one or more pieces of media content on the side of the media transmit end, each piece of media content includes multiple media objects, and each media object includes multiple media object attributes; and the sending a first announcement message to a media receive end includes sending the first announcement message to the media receive end when the change amount meets a preset condition.

With reference to the first aspect, the first or the second possible implementation manner of the first aspect, in a third possible implementation manner, the updating operation instruction includes at least one of an addition identifier, a replacement identifier, or a removal identifier, where a media object attribute that is corresponding to the addition identifier and that is in the changed media object attribute is a newly added media object attribute; a media object attribute that is corresponding to the replacement identifier and that is in the changed media object attribute is a replaced media object attribute; and a media object attribute that is corresponding to the removal identifier and that is in the changed media object attribute is a to-be-removed media object attribute.

A second aspect of the present disclosure provides a media transmit end, including an obtaining unit configured to obtain a changed media object attribute on a side of the media transmit end, where the media object attribute is included in a media object, and the media object is included in media content; a determining unit configured to determine an updating operation instruction for the changed media object attribute according to a change type of the changed media object attribute obtained by the obtaining unit; and a sending unit configured to send a first announcement message to a media receive end, where the first announcement message includes the updating operation instruction and the changed media object attribute, so that the media receive end updates, according to the updating operation instruction and the changed media object attribute, media content that is on the side of the media transmit end and that is stored on a side of the media receive end.

A third aspect of the present disclosure provides a media receive end, including a receiving unit configured to receive a first announcement message sent by a media transmit end, where the first announcement message includes an updating operation instruction and a changed media object attribute, where the changed media object attribute is obtained by the media transmit end when a media object attribute on a side of the media transmit end changes, and the updating operation instruction is determined by the media transmit end according to a change type of the changed media object attribute, where the media object attribute is included in a media object, and the media object is included in media content; and an updating unit configured to update media content stored on a side of the media receive end according to the updating operation instruction and the changed media object attribute that are received by the receiving unit.

A fourth aspect of the present disclosure provides a media content updating system, including a media transmit end and a media receive end, where the media transmit end is configured to obtain a changed media object attribute on a side of the media transmit end, where the media object attribute is included in a media object, and the media object is included in media content; determine an updating operation instruction for the changed media object attribute according to a change type of the changed media object attribute; and send a first announcement message to the media receive end, where the first announcement message includes the updating operation instruction and the changed media object attribute, so that the media receive end updates, according to the updating operation instruction and the changed media object attribute, media content that is on the side of the media transmit end and that is stored on a side of the media receive end; and the media receive end is configured to receive the first announcement message sent by the media transmit end, and update, according to the updating operation instruction and the changed media object attribute, the media content that is on the side of the media transmit end and that is stored on the side of the media receive end.

In the embodiments of the present disclosure, a media transmit end obtains a changed media object attribute on a side of the media transmit end, where the media object attribute is included in a media object, and the media object is included in media content; the media transmit end determines an updating operation instruction for the changed media object attribute according to a change type of the changed media object attribute; and the media transmit end sends a first announcement message to a media receive end, where the first announcement message includes the updating operation instruction and the changed media object attribute, so that the media receive end updates, according to the updating operation instruction and the changed media object attribute, media content that is on the side of the media transmit end and that is stored on a side of the media receive end. Compared with the prior art in which a media transmit end adds all media content on a side of the media transmit end to an announcement message, in the embodiments of the present disclosure, when media content on the side of the media transmit end changes, the announcement message carries a changed media object attribute and an updating operation instruction for the changed media object attribute, so that a bandwidth occupancy rate can be reduced.

BRIEF DESCRIPTION OF DRAWINGS

To describe the technical solutions in the embodiments of the present disclosure or in the prior art more clearly, the following briefly describes the accompanying drawings required for describing the embodiments or the prior art. The accompanying drawings in the following description show merely some embodiments of the present disclosure, and persons of ordinary skill in the art may still derive other drawings from these accompanying drawings without creative efforts.

DESCRIPTION OF EMBODIMENTS

Embodiments of the present disclosure provide a media content updating method, in which only a changed media object attribute is sent, so that bandwidth may be saved. The embodiments of the present disclosure further provide a corresponding apparatus and system. Details are separately illustrated in the following.

To make persons skilled in the art understand the technical solutions in the present disclosure better, the following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by persons of ordinary skill in the art based on the embodiments of the present disclosure without creative efforts shall fall within the protection scope of the present disclosure.

Figure 1:
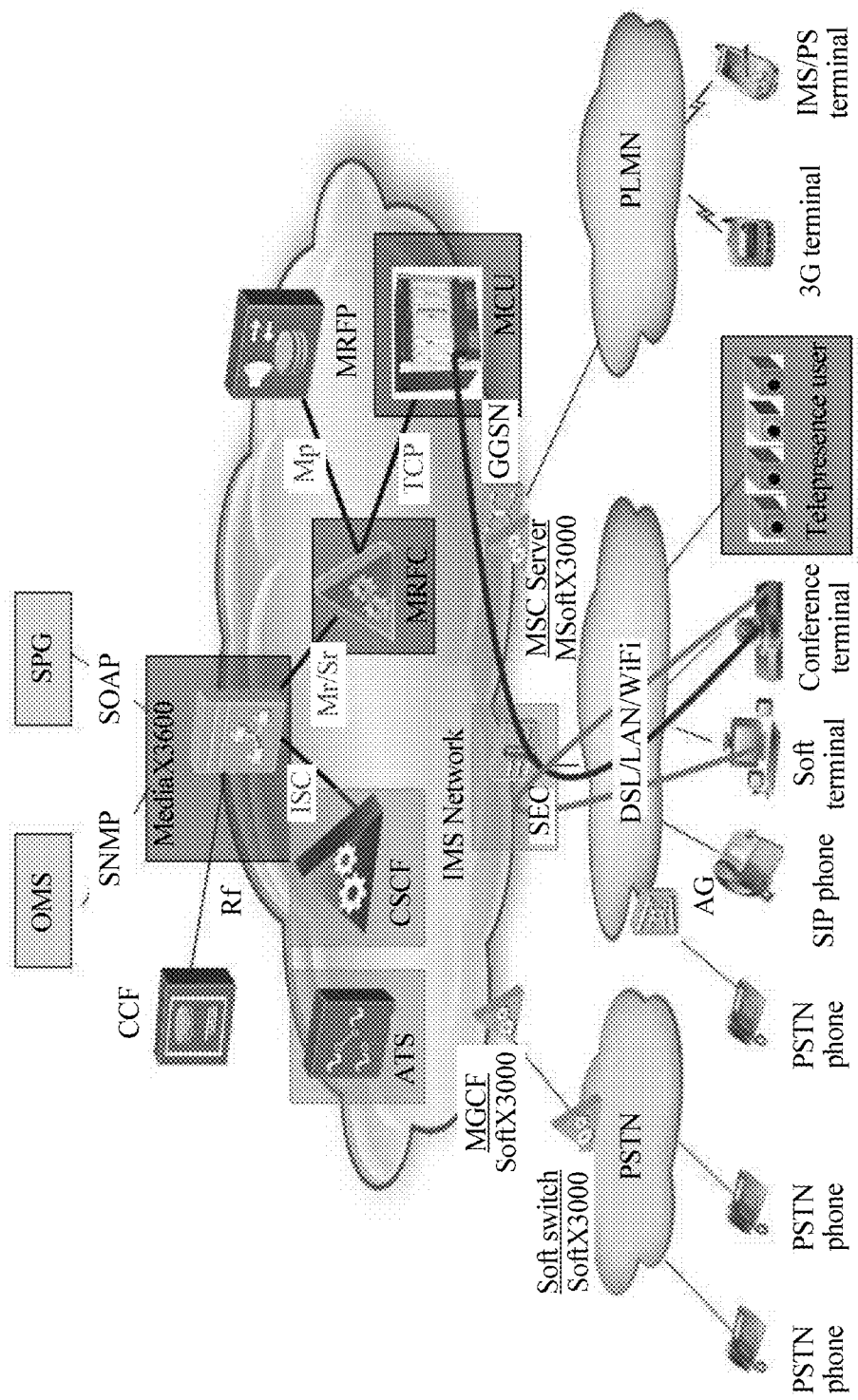
FIG. 1 is a schematic diagram of an embodiment of a media content updating method according to an embodiment of the present disclosure.

Referring to FIG. 1, an Internet Protocol multimedia subsystem (IMS) may include multiple communications terminals, such as a soft terminal, a conference terminal, a telepresence user, a third generation (3G) terminal, and an IMS or packet switching (PS) terminal. All these terminals can generate multiple audio/video streams, whereas an ordinary public switched telephone network (PSTN) phone and a Session Initiation Protocol (SIP) phone can generate only one audio/video stream. Under a point-to-point condition, these terminals that can generate multiple audio/video streams may communicate with each other without using a multipoint control unit (MCU), and under a multipoint condition, when the terminals that can generate multiple audio/video streams communicate with another terminal, the MCU is required for communication. All terminals are connected to an IMS network using different networks, so as to implement communication with another terminal. The networks used for connecting all terminals to the IMS network are not a focus of the present disclosure, and therefore are not described in details herein.

In the embodiments of the present disclosure, the IMS is used only as an example for description, but actual application of the embodiments of the present disclosure is not limited to the IMS, and may further be used in another system.

The embodiments of the present disclosure are all described from perspectives of a media transmit end and a media receive end. Actually, either a terminal that can generate multiple audio/video streams or an MCU may serve as both a media transmit end and a media receive end.

In point-to-point communication, a communication process between the soft terminal and the conference terminal is used as an example, and regardless of which of the soft terminal and the conference terminal is used as a media transmit end or a media receive end, a media content updating process described in the embodiments of the present disclosure may be executed.

Under a condition of multipoint communication, communication between the conference terminal and another terminal needs to be performed using the MCU. First, the conference terminal serves as a media transmit end, the MCU serves as a media receive end, and then the MCU serves as a media transmit end, and another device serves as a media receive end, so that a communication process between the conference terminal and another terminal is implemented finally.

In addition, it should be noted that both a second announcement message and a first announcement message in the embodiments of the present disclosure may be actually referred to as an announcement message. In the embodiments of the present disclosure, the foregoing name differentiation is intended only to differentiate different media content included in an announcement message.

In addition, in the embodiments of the present disclosure, media content carried in an announcement message is a grand concept, which may include three layers. A first layer is referred to as media content, a second layer is referred to as a media object, and a third layer is referred to as a media object attribute.

Figure 2:
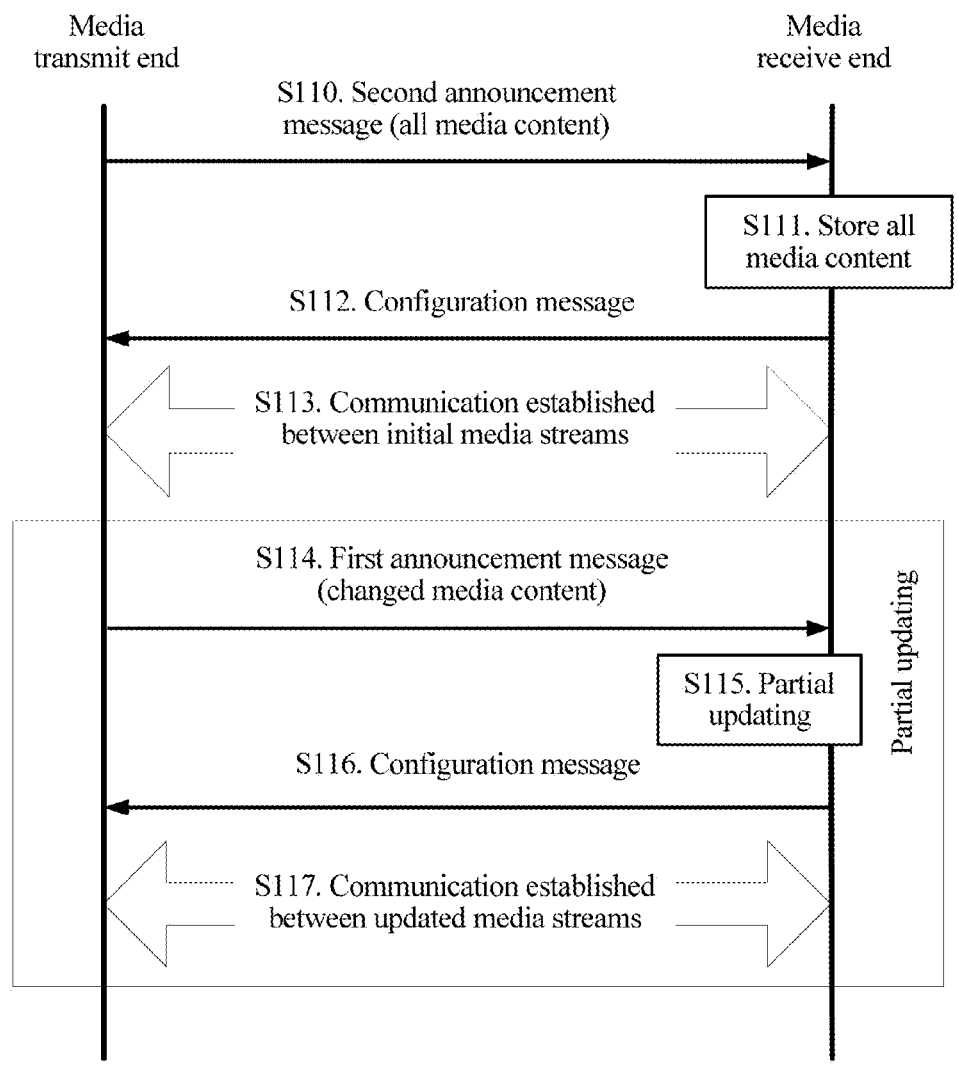
FIG. 2 is a schematic diagram of another embodiment of a media content updating method according to an embodiment of the present disclosure.

Referring to FIG. 2, an embodiment of implementing media content updating for a media receive end by performing communication between a media transmit end and the media receive end in the embodiments of the present disclosure includes the following steps.

S110. At an initial phase of establishing a session between the media transmit end and the media receive end, the media transmit end sends a second announcement message to the media receive end, where the second announcement message carries all media content on a side of the media transmit end.

It is assumed that the media transmit end is a three-camera and three-screen system with a substream device, and the second announcement message may include the following media content: a capture identifier captureID=1, which is media content captured by a first camera, and a codec group is EG1; a capture identifier captureID=2, which is media content captured by a second camera when the second camera is set to be Zoom-in, that is, zoom-in, and a codec group is EG2; a capture identifier captureID=3, which is media content captured by a third camera, and a codec group is EG3; and a capture identifier captureID=4, which is a substream that is provided by a substream device and that is used to present a report, and a codec group is EG4.

S111. The media receive end receives the second announcement message sent by the media transmit end, and stores all the media content on the side of the media transmit end carried in the second announcement message.

S112. The media receive end selects a required media content identifier according to the media content carried in this announcement message, and sends, using a configuration message, the required media content identifier to the media transmit end.

For example, the media receive end may reselect a required media content identifier with reference to a policy of the media receive end.

For example, the configuration message may carry the captureID=1, which indicates that the media receive end requires the media transmit end to provide a media stream of the media content that is captured by the first camera.

S113. The media transmit end receives the configuration message of the media receive end, and sends a corresponding media stream to the media receive end according to a media content identifier carried in the configuration message, so as to implement establishment of an initial media stream from the media transmit end to the media receive end.

S114. After the session establishment is completed, when the media content on the side of the media transmit end changes, the media transmit end subsequently sends a first announcement message to the media receive end, where the first announcement message carries the changed media content and an updating operation instruction that is determined according to a change type.

The media content and the corresponding updating operation instruction that are included in the first announcement message may be the following.

A capture area of the capture identifier captureID=2 changes, a corresponding updating operation instruction is a replacement identifier, and the media content captured when the second camera is set to be Zoom-in, that is, zoom-in, is updated to be media content captured when the second camera is set to be Zoom-out, that is, zoom-out, and a codec group is EG2A; and the capture identifier captureID=4 is removed, a corresponding updating operation instruction is a removal identifier, that is, a substream that is closed by a substream device and that is used to present a report, and a codec group is the EG4.

S115. The media receive end receives the first announcement message sent by the media transmit end, where the first announcement message carries the changed media content, and the media receive end updates, according to the media content carried in the first announcement message, locally stored media content that is on a side of the media receive end.

Because the second camera changes, the media receive end replaces the originally stored codec group=EG2 with the codec group=EG2A, and removes the originally stored codec group=EG4.

S116. The media receive end reselects a required media content identifier and sends, using the configuration message, the media content identifier to the media transmit end.

For example, the media receive end may reselect the required media content identifier with reference to the policy of the media receive end.

S117. The media transmit end receives the configuration message of the media receive end, and sends the corresponding media stream to the media receive end according to the media content identifier carried in the configuration message, so as to implement establishment of an updated media stream from the media transmit end to the media receive end.

The media content identifiers carried in the configuration messages in S112 and S116 may be the same, or may be different. Specific identifiers carried in the configuration messages are determined by the media receive end. It can be learned from some foregoing updating processes that, in some updating processes, the first announcement message needs to carry only the changed media content and the updating operation instruction, which may reduce a bandwidth occupancy rate.

Figure 3:
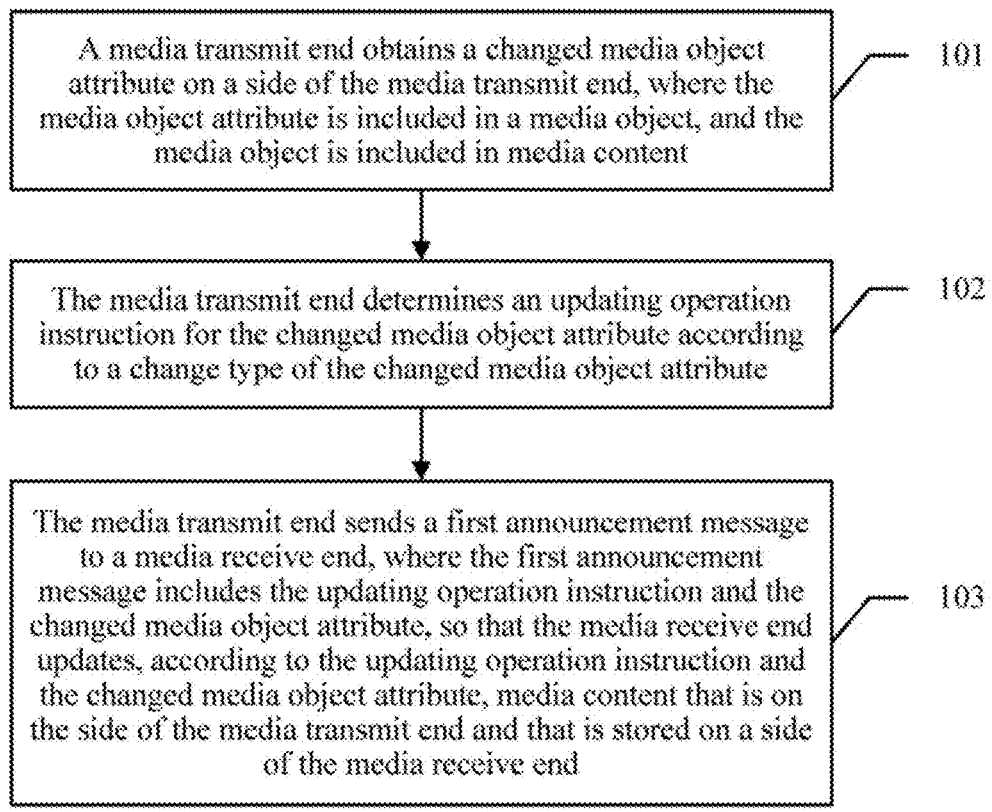
FIG. 3 is a schematic diagram of another embodiment of a media content updating method according to an embodiment of the present disclosure.

Referring to FIG. 3, an embodiment of implementing media content updating for a media receive end by performing communication between a media transmit end and the media receive end in the embodiments of the present disclosure includes the following steps.

Step 101. The media transmit end obtains a changed media object attribute on a side of the media transmit end, where the media object attribute is included in a media object, and the media object is included in media content.

The side of the media transmit end may include one or more pieces of media content, and each piece of media content may include the following media objects: media capture, a capture scene, a simultaneous transmission set, a codec group (encoding Groups), and information about participants (people), and the like.

The media capture is actual content captured by a camera or a microphone, for example, an audio/video of a speech of a president at a conference site.

The codec group is information such as a codec format and bandwidth that is used for content captured by media.

The capture scene is description information of the conference site, for example, including spatial areas of one or more capture devices.

The simultaneous transmission set is a set of media captures that may be simultaneously transmitted. For example, images that can be captured when a same camera zooms out or zooms in are respectively a VC1 and a VC2. Because the camera cannot zoom out and zoom in simultaneously, the VC1 and the VC2 cannot exist simultaneously, and the VC1 and the VC2 cannot be placed in a same transmission set. The information about the participants is description information of parties attending a conference, such as a market department, a finance department, a technical department, and an administration department.

Each media object may include multiple media object attributes, for example, the media capture may include media object attributes such as a capture identifier (capture ID), spatial information, a capture scene identifier (capture Scene ID), a codec group identifier (encGroup ID), and a participant identifier (people IDs).

Addition of a media object attribute in media content on the side of the media transmit end, replacement of an original media object attribute in the media content on the side of the media transmit end with a new media object attribute, and removal of the original media object attribute in the media content on the side of the media transmit end may all be considered as changes of the media content on the side of the media transmit end.

Step 102. The media transmit end determines an updating operation instruction for the changed media object attribute according to a change type of the changed media object attribute.

The change type of the changed media object attribute means that the changed media object attribute is newly added, replaced, or removed, and corresponding updating operation instructions may be respectively an addition identifier, a replacement identifier, and a removal identifier.

Step 103. The media transmit end sends a first announcement message to a media receive end, where the first announcement message includes the updating operation instruction and the changed media object attribute, so that the media receive end updates, according to the updating operation instruction and the changed media object attribute, media content that is on the side of the media transmit end and that is stored on a side of the media receive end.

In this embodiment of the present disclosure, the media content that is on the side of the media transmit end and that is stored on the side of the media receive end is media content before change of the changed media content.

In this embodiment of the present disclosure, a media transmit end obtains a changed media object attribute on a side of the media transmit end, where the media object attribute is included in a media object, and the media object is included in media content; the media transmit end determines an updating operation instruction for the changed media object attribute according to a change type of the changed media object attribute; and the media transmit end sends a first announcement message to a media receive end, where the first announcement message includes the updating operation instruction and the changed media object attribute, so that the media receive end updates, according to the updating operation instruction and the changed media object attribute, media content that is on the side of the media transmit end and that is stored on a side of the media receive end. Compared with the prior art in which a media transmit end adds all media content on a side of the media transmit end to an announcement message, in this embodiment of the present disclosure, when a media object attribute on a side of the media transmit end changes, the announcement message carries a changed media object attribute and an operation instruction for the changed media object attribute, so that a bandwidth occupancy rate can be reduced.

Optionally, on the basis of the foregoing embodiment corresponding to FIG. 3, in a first optional embodiment of the media content updating method provided in the embodiments of the present disclosure, before the sending a first announcement message to a media receive end, the method may further include sending, by the media transmit end, a second announcement message to the media receive end, where the second announcement message carries all media content on the side of the media transmit end, so that the media receive end stores all the media content on the side of the media transmit end.

Optionally, on the basis of the foregoing embodiment or the first optional embodiment that is corresponding to FIG. 3, in a second optional embodiment of the media content updating method provided in the embodiments of the present disclosure, before the sending, by the media transmit end, a first announcement message to a media receive end, the method further includes determining a change amount of the changed media object attribute relative to changed media content on the side of the media transmit end, where the media content on the side of the media transmit end includes one or more pieces of media content on the side of the media transmit end, each piece of media content includes multiple media objects, and each media object includes multiple media object attributes.

The sending a first announcement message to a media receive end includes sending the first announcement message to the media receive end when the change amount meets a preset condition.

In this embodiment of the present disclosure, when the changed media object attribute has extremely slight impact on the media content on the side of the media receive end, to avoid frequently sending the first announcement message and wasting bandwidth, the first announcement message may not be sent when the change amount of the changed media object attribute relative to the changed media content on the side of the media transmit end does not meet the present condition. The preset condition may be a specific value, for example, 2%, or certainly may be another value.

Optionally, on the basis of the foregoing second optional embodiment corresponding to FIG. 3, in a third optional embodiment of the media content updating method provided in the embodiments of the present disclosure, the determining a change amount of the changed media object attribute relative to changed media content on the side of the media transmit end includes determining an updating degree of the changed media object attribute relative to the changed media content on the side of the media transmit end.

The sending the first announcement message to the media receive end when the change amount meets a preset condition includes sending the first announcement message to the media receive end when the updating degree falls within a preset updating interval.

Optionally, on the basis of the foregoing third optional embodiment corresponding to FIG. 3, in a fourth optional embodiment of the media content updating method provided in the embodiments of the present disclosure, the determining an updating degree of the changed media object attribute relative to the changed media content on the side of the media transmit end may include obtaining a weight of each media object in each piece of media content, and an association degree between each media object and another media object than the media object that are in same media content; and obtaining, by means of calculation, the updating degree according to a preset updating degree calculation formula, and according to a weight and an association degree that are of a media object to which the changed media object attribute belongs, and a weight and an association degree that are of each media object in each piece of media content.

Optionally, on the basis of the foregoing fourth optional embodiment corresponding to FIG. 3, in a fifth optional embodiment of the media content updating method provided in the embodiments of the present disclosure, the obtaining, by means of calculation, the updating degree according to a preset updating degree calculation formula, and according to a weight and an association degree that are of a media object to which the changed media object attribute belongs, and a weight and an association degree that are of each media object in each piece of media content includes obtaining the updating degree using a sum of products of the weights and the association degrees that are of the media objects to which the changed media object attribute belongs as a numerator factor, and using a sum of products of the weights and the association degrees that are of all media objects in each piece of media content as a denominator factor.

In the third to the fifth optional embodiments of the present disclosure, a weight of each media object may be preset, for example, a weight of a media capture is 0.5, a weight of a capture scene is 0.1, a weight of a simultaneous transmission set is 0.3, a weight of a codec group is 0.5, and a weight of information about participants is 0.1.

In streaming content, media objects are associated with each other, and for an association relationship between media objects, an association relationship model may be pre-established. For the association relationship model, refer to FIG. 4 for understanding.

Figure 4:
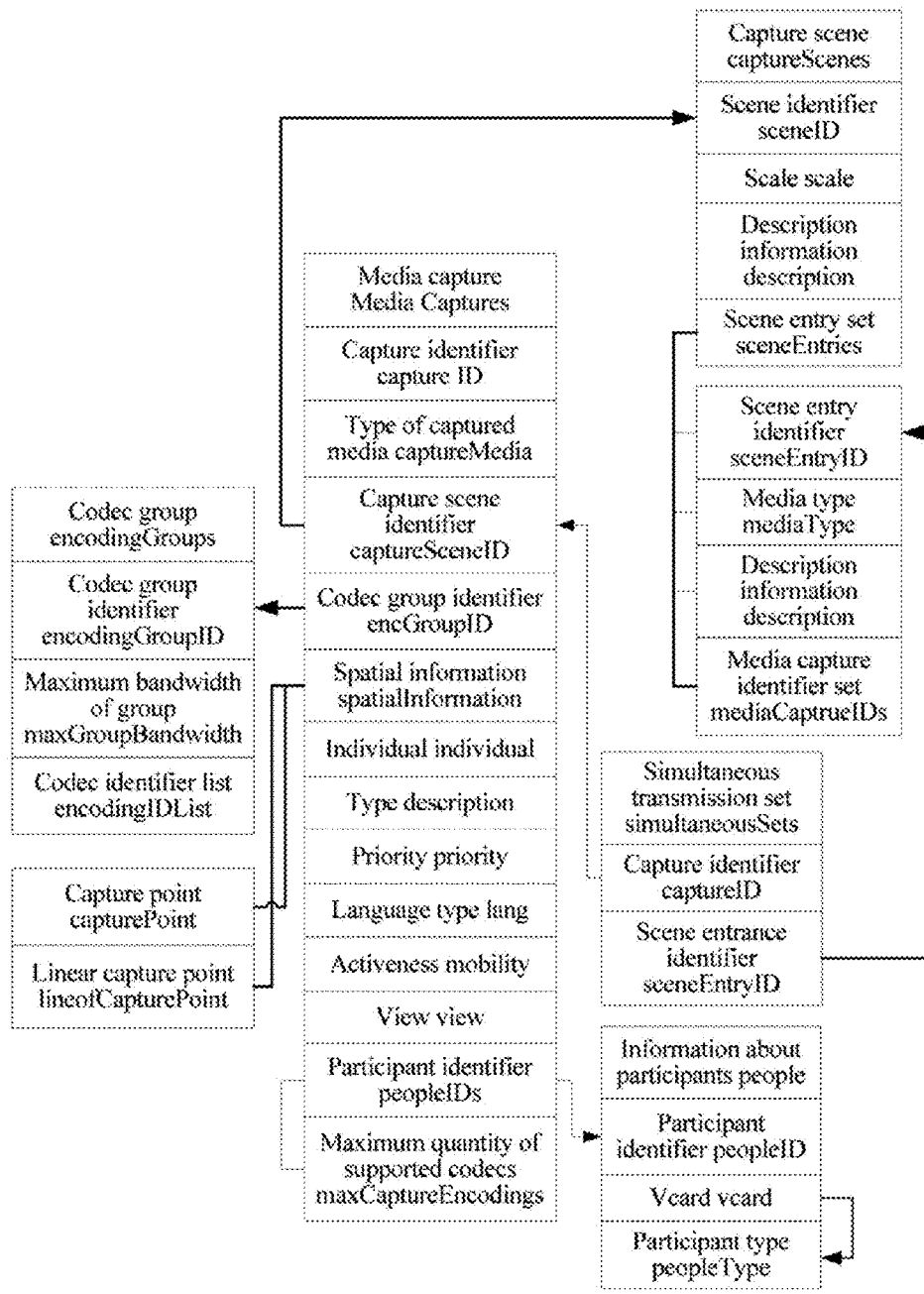
FIG. 4 is a schematic diagram of another embodiment of a media content updating method according to an embodiment of the present disclosure.

For example, the "media capture" is associated with the "codec group", the "capture scene", the "simultaneous transmission set", and the "information about the participants" (as shown by arrows in FIG. 4). There is one arrow between the media capture and the codec group, and therefore an association degree between the media capture and the codec group is 1. Association degrees between the media capture and the capture scene, the simultaneous transmission set, and the information about the participants are respectively 1, and therefore an association degree of the "media capture" is 4. The "information about the participants" is associated only with the "media capture", and therefore an association degree of the "information about the participants" is 1.

A weight of the media object is represented by WP, an association degree of the media object is represented by AI, and an updating degree is represented by UP. A formula for the updating degree may be presented as:

$$UP=[\text{Element1}(wp^*ai)+\text{Element2}(wp^*ai)]/[\text{Element1}(wp^*ai)+\text{Element2}(wp^*ai)+\ldots+\text{Element}N(wp^*ai)]$$

Element1 to ElementN indicate all media objects in the media content on the side of the media transmit end. For example, the side of the media transmit end has three pieces of media content, and each piece of media content has five media objects, and in this case, N=15, and Element1 to ElementN are Element1 to Element15.

The foregoing formula is merely an example, and actually a variant formula of the formula may further be used, for example, $$UP=M[\text{Element1}(wp^*ai)+\text{Element2}(wp^*ai)]/N[\text{Element1}(wp^*ai)+\text{Element2}(wp^*ai)+\ldots+\text{Element}N(wp^*ai)]$$

Both M and N may be constants, and M may be equal to N, or may be unequal to N.

After the UP is obtained through calculation using the foregoing formula, the UP may be compared with the preset updating interval. For example, a range of the updating interval may be x %-y %, and when the UP falls within the range x %-y %, it may be determined to perform updating. If the UP is greater than y %, full updating is performed. An overall updating process is the same as that in the prior art, and details are not described herein. When the UP is less than x %, it indicates that the updating degree is quite small, and a weight of updated information is quite small, and does not need to be sent to the media receive end, and therefore an announcement message does not need to be sent, and bandwidth may further be saved.

Optionally, on the basis of any embodiment of the foregoing embodiment, or the first to the fifth optional embodiments that are corresponding to FIG. 3, in a sixth optional embodiment of the media content updating method provided in the embodiments of the present disclosure, the updating operation instruction includes at least one of the addition identifier, the replacement identifier, or the removal identifier; a media object attribute that is corresponding to the addition identifier and that is in the changed media object attribute is a newly added media object attribute; a media object attribute that is corresponding to the replacement identifier and that is in the changed media object attribute is a replaced media object attribute; and a media object attribute that is corresponding to the removal identifier and that is in the changed media object attribute is a to-be-removed media object attribute.

In this embodiment of the present disclosure, for example, if the changed media object attribute includes media object attributes A, B, and C, where if the media object attribute A is a newly added media object attribute, an updating operation instruction corresponding to the media object attribute A is an addition identifier, which may be represented by add; if the media object attribute B is description information before changing and a changed media object attribute, and an operating identifier corresponding to the media object attribute B is a replacement identifier, which may be represented by replace; and if the media object attribute C is a to-be-removed media object attribute, an updating operation instruction corresponding to the media object attribute C is a removal identifier, which may be represented by remove.

Optionally, on the basis of the foregoing sixth optional embodiment corresponding to FIG. 3, in a seventh optional embodiment of the media content updating method provided in the embodiments of the present disclosure, when the updating operation instruction includes the addition identifier, the first announcement message further carries location information of the newly added media object attribute, so that the media receive end adds the newly added media object attribute to a corresponding location according to the location information of the newly added media object attribute.

Optionally, on the basis of the foregoing sixth optional embodiment corresponding to FIG. 3, in an eighth optional embodiment of the media content updating method provided in the embodiments of the present disclosure, when the updating operation instruction includes the replacement identifier, the first announcement message further carries description information of the replaced media object attribute before updating, where the description information before updating is a media object attribute before updating or location information of the media object attribute before updating, so that the media receive end updates the replaced media object attribute into a corresponding location according to the media object attribute before updating or the location information of the media object attribute before updating.

Optionally, on the basis of the foregoing sixth optional embodiment corresponding to FIG. 3, in a ninth optional embodiment of the media content updating method provided in the embodiments of the present disclosure, when the updating operation instruction includes the removal identifier, the first announcement message further carries an association removal identifier, so that the media receive end removes, according to the association removal identifier, a media object attribute associated with the to-be-removed media object attribute.

In this embodiment of the present disclosure, when the media object attribute C needs to be removed, another media object attribute D associated with the media object attribute may need to be removed consequently, and therefore the association removal identifier needs to be carried, so that the media receive end removes the media object attribute D as well when removing the media object attribute C.

In this embodiment of the present disclosure, an example in which the first announcement message includes the addition identifier, the replacement identifier, and the removal identifier is used for description.

When media capture of the capture identifier captureID=2 that is of a media object attribute needs to be removed, and a media object attribute associated with the captureID=2 needs to be removed, if the media capture of the captureID=2 is associated with MediaCaptureIDs in SceneID=1 of the capture scene, the MediaCaptureIDs need to be updated, and the media capture of the captureID=2 is associated with a participant identifier peopleID=Alice in the information about the participants; and in an announcement message, a media object attribute corresponding to the removal identifier remove is the captureID=2, and correspondingly, after the captureID=2 is removed, the personID=Alice associated with the captureID=2 may also be removed.

An addition identifier of the information about the participants is peopleID=Ciccio, and the peopleID=Ciccio is located in a capture area of media capture of media information captureID=4, and therefore the peopleID=Ciccio needs to be added to the media capture of the captureID=4.

In this case, the announcement message carries the addition identifier add, and a media object attribute corresponding to the add is the identifier peopleID=Ciccio of the information about the participants.

When the information about the participants is located in a capture area of media capture of the captureID=3, the information about the participants Lucy is replaced by Mike, that is, peopleID=Lucy is replaced by peopleID=Mike.

In this case, the announcement message carries the replacement identifier replace, and a corresponding media object attribute may be the peopleID=Lucy and the peopleID=Mike.

Figure 5:
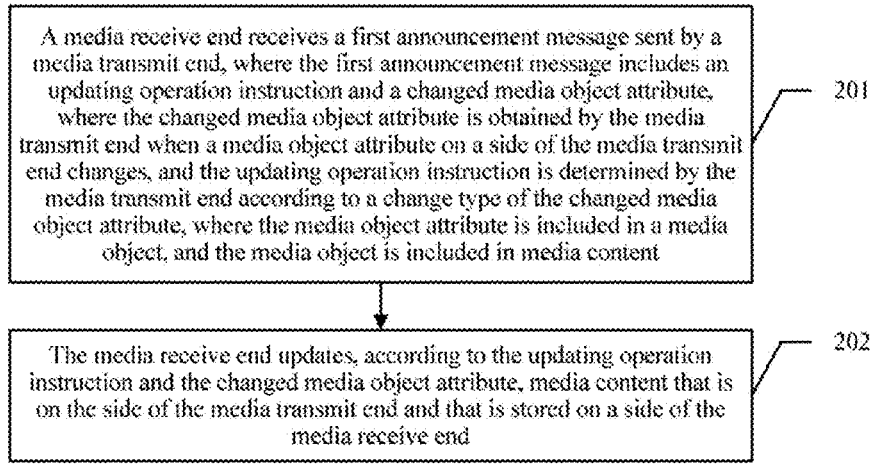
FIG. 5 is a schematic diagram of another embodiment of a media content updating method according to an embodiment of the present disclosure.

Referring to FIG. 5, another embodiment of a media content updating method provided in the embodiments of the present disclosure includes the following steps.

201. A media receive end receives a first announcement message sent by a media transmit end, where the first announcement message includes an updating operation instruction and a changed media object attribute, where the changed media object attribute is obtained by the media transmit end when a media object attribute on a side of the media transmit end changes, and the updating operation instruction is determined by the media transmit end according to a change type of the changed media object attribute, where the media object attribute is included in a media object, and the media object is included in media content.

202. The media receive end updates, according to the updating operation instruction and the changed media object attribute, media content that is on the side of the media transmit end and that is stored on a side of the media receive end.

In this embodiment of the present disclosure, a media receive end receives a first announcement message sent by a media transmit end, where the first announcement message includes an updating operation instruction and a changed media object attribute, where the changed media object attribute is obtained by the media transmit end when a media object attribute on a side of the media transmit end changes, and the updating operation instruction is determined by the media transmit end according to a change type of the changed media object attribute, where the media object attribute is included in a media object, and the media object is included in media content. The media receive end updates, according to the updating operation instruction and the changed media object attribute, media content that is on the side of the media transmit end and that is stored on a side of the media receive end. Compared with the prior art in which all media object attributes in media content on the side of the media receive end are updated each time, in the media content updating method provided in this embodiment of the present disclosure, only the changed media object attribute may be updated according to the updating operation instruction, thereby improving an updating speed. In addition, only the changed media object attribute needs to be stored, so that redundancy is reduced and storage space is saved.

Optionally, on the basis of the embodiment corresponding to FIG. 5, in a first optional embodiment of the media content updating method provided in the embodiments of the present disclosure, the media receive end further receives a second announcement message sent by the media transmit end, where the second announcement message carries all media content on the side of the media transmit end, and stores all the media content on the side of the media transmit end.

Optionally, on the basis of the foregoing embodiment or the first optional embodiment that are corresponding to FIG. 5, in a second optional embodiment of the media content updating method provided in the embodiments of the present disclosure, the updating operation instruction includes at least one of an addition identifier, a replacement identifier, or a removal identifier; a media object attribute that is corresponding to the addition identifier and that is in the changed media object attribute is a newly added media object attribute, and the media receive end adds, according to the addition identifier, the newly added media object attribute to the media object attribute stored on the side of the media receive end; a media object attribute that is corresponding to the replacement identifier and that is in the changed media object attribute is a replaced media object attribute, and the media receive end replaces, according to the replacement identifier, the replaced media object attribute to the media object attribute stored on the side of the media receive end; and ca media object attribute that is corresponding to the removal identifier and that is in the changed media object attribute is a to-be-removed media object attribute, and the media receive end removes, according to the removal identifier, the to-be-removed media object attribute that is in the media object attribute stored on the side of the media receive end.

In this embodiment of the present disclosure, when updating the media content on the side of the media receive end, the media receive end may perform corresponding updating according to a specific addition identifier, replacement identifier, and removal identifier.

Optionally, on the basis of the foregoing second optional embodiment corresponding to FIG. 5, in a third optional embodiment of the media content updating method provided in the embodiments of the present disclosure, when the updating operation instruction includes the addition identifier, the first announcement message further carries location information of the newly added media object attribute, and the media receive end adds the newly added media object attribute to a corresponding location according to the location information of the newly added media object attribute.

Optionally, on the basis of the foregoing second optional embodiment corresponding to FIG. 5, in a fourth optional embodiment of the media content updating method provided in the embodiments of the present disclosure, when the updating operation instruction includes the replacement identifier, the first announcement message further carries description information of the replaced media object attribute before updating, where the description information before updating is a media object attribute before updating or location information of the media object attribute before updating, so that the media receive end updates the replaced media object attribute into a corresponding location according to the media object attribute before updating or the location information of the media object attribute before updating.

Optionally, on the basis of the foregoing second optional embodiment corresponding to FIG. 5, in a fifth optional embodiment of the media content updating method provided in the embodiments of the present disclosure, when the updating operation instruction includes the removal identifier, the first announcement message further carries an association removal identifier, and the media receive end removes, according to the association removal identifier, a media object attribute associated with the to-be-removed media object attribute.

In this embodiment of the present disclosure, when a media object attribute C needs to be removed, another media object attribute D associated with the media object attribute may need to be removed consequently, and therefore the association removal identifier needs to be carried, so that the media receive end removes the media object attribute D as well when removing the media object attribute C. The foregoing solution described in FIG. 1 to FIG. 5 is an updating process initiated when media content on a side of the media transmit end changes. Actually, a media receive end may also issue an updating requirement, and a media transmit end provides a corresponding media object attribute according to the requirement of the media receive end, and then the media receive end performs corresponding updating. For a specific process, refer to FIG. 6 for understanding.

Figure 6:
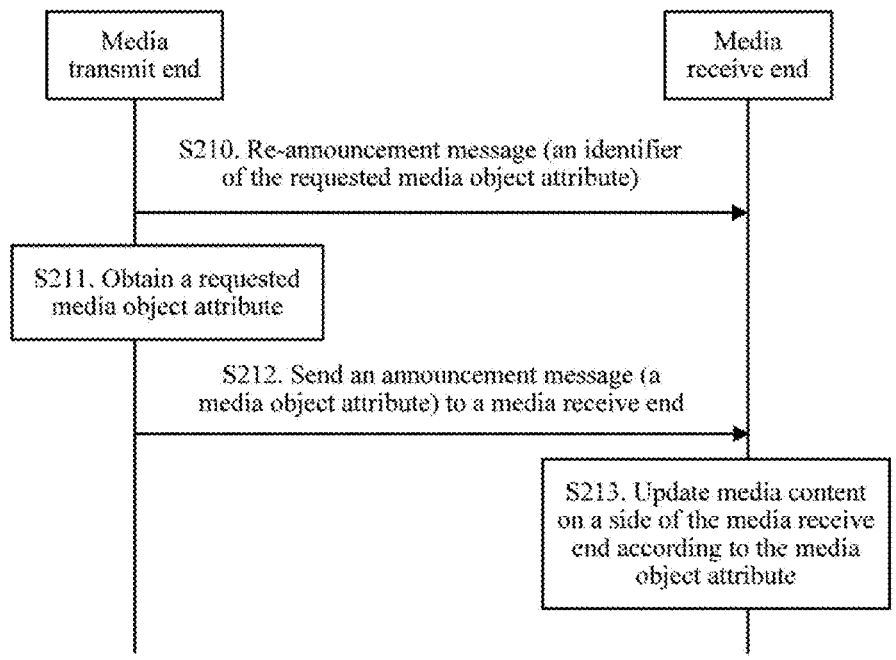
FIG. 6 is a schematic diagram of another embodiment of a media content updating method according to an embodiment of the present disclosure.

Referring to FIG. 6, another embodiment of implementing media content updating for a media receive end by performing communication between a media transmit end and the media receive end in the embodiments of the present disclosure includes the following steps.

S210. A media receive end sends a re-announcement message to a media transmit end, where the re-announcement message carries an identifier of a requested media object attribute that is in media content.

S211. After receiving the re-announcement message sent by the media receive end, the media transmit end obtains a media object attribute corresponding to the identifier of the requested media object attribute that is in the media content.

When the re-announcement message further carries an association identifier, the association identifier is used to indicate that another media object attribute associated with the requested media object attribute is further requested.

The media transmit end further obtains the another media object attribute associated with the requested media object attribute.

S212. The media transmit end sends an announcement message to the media receive end.

The announcement message carries the media object attribute corresponding to the identifier of the requested media object attribute.

Optionally, the sent announcement message further carries the media object attribute associated with the requested media object attribute.

S213. The media receive end updates media content on a side of the media receive end according to the requested media object attribute.

Optionally, the updating media content on a side of the media receive end according to the requested media object attribute may further include updating media content according to another media object attribute associated with the requested media object attribute.

According to the media content updating method in this embodiment of the present disclosure, when a media receive end needs to perform updating, the media receive end requests, from a media transmit end, a media object attribute that needs to be updated, so as to implement updating for a specific media object attribute, without a need of updating all media object attributes on a side of the media receive end. Media content updating is implemented and bandwidth is saved.

Figure 7:
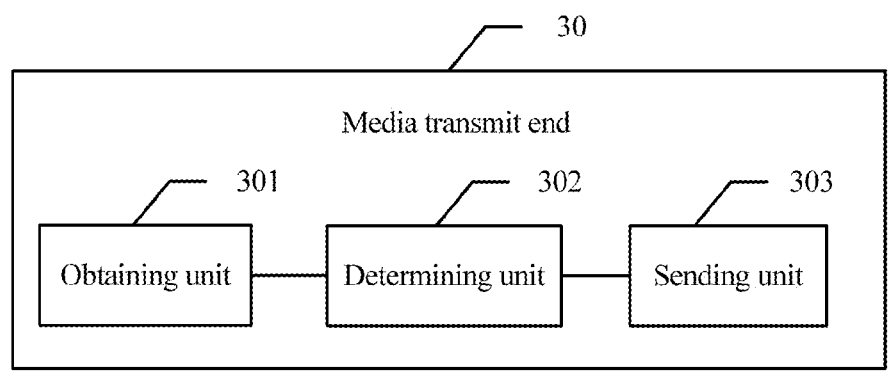
FIG. 7 is a schematic diagram of an embodiment of a media transmit end according to an embodiment of the present disclosure.

Referring to FIG. 7, an embodiment of a media transmit end 30 provided in the embodiments of the present disclosure includes the following: an obtaining unit 301 configured to obtain a changed media object attribute on a side of the media transmit end, where the media object attribute is included in a media object, and the media object is included in media content; a determining unit 302 configured to determine an updating operation instruction for the changed media object attribute according to a change type of the changed media object attribute that is obtained by the obtaining unit 301; and a sending unit 303 configured to send a first announcement message to a media receive end, where the first announcement message includes the updating operation instruction determined by the determining unit 302 and the changed media object attribute, so that the media receive end updates, according to the updating operation instruction and the changed media object attribute, media content that is on the side of the media transmit end 30 and that is stored on a side of the media receive end.

In this embodiment of the present disclosure, an obtaining unit 301 obtains a changed media object attribute on a side of a media transmit end 30, where the media object attribute is included in a media object, and the media object is included in media content; a determining unit 302 determines an updating operation instruction for the changed media object attribute according to a change type of the changed media object attribute that is obtained by the obtaining unit 301; and a sending unit 303 sends a first announcement message to a media receive end, where the first announcement message includes the updating operation instruction determined by the determining unit 302 and the changed media object attribute, so that the media receive end updates, according to the updating operation instruction and the changed media object attribute, media content that is on the side of the media transmit end 30 and that is stored on a side of the media receive end. Compared with the prior art in which a media transmit end adds all media content on a side of the media transmit end to an announcement message, in this embodiment of the present disclosure, when a media object attribute on a side of the media transmit end 30 changes, the announcement message carries a changed media object attribute and an updating operation instruction for the changed media object attribute, so that a bandwidth occupancy rate can be reduced.

Optionally, on the basis of the foregoing embodiment corresponding to FIG. 7, in a first optional embodiment of the media transmit end provided in the embodiments of the present disclosure, the sending unit 303 is further configured to send a second announcement message to the media receive end before sending the first announcement message to the media receive end, where the second announcement message carries all media content on the side of the media transmit end 30, so that the media receive end stores all the media content on the side of the media transmit end 30.

Optionally, on the basis of the foregoing embodiment or the first optional embodiment that are corresponding to FIG. 7, in a second optional embodiment of the media transmit end 30 provided in the embodiments of the present disclosure, the determining unit 302 is further configured to determine a change amount of the changed media object attribute relative to changed media content on the side of the media transmit end 30, where the media content on the side of the media transmit end 30 includes one or more pieces of media content on the side of the media transmit end 30, each piece of media content includes multiple media objects, and each media object includes multiple media object attributes; and the sending unit 303 is further configured to send the first announcement message to the media receive end when the change amount meets a preset condition.

Optionally, on the basis of the second optional embodiment corresponding to FIG. 7, in a third optional embodiment of the media transmit end 30 provided in the embodiments of the present disclosure, the determining unit 302 is configured to determine an updating degree of the changed media object attribute relative to the changed media content on the side of the media transmit end 30; and the sending unit 303 is configured to send the first announcement message to the media receive end when the updating degree falls within a preset updating interval.

Figure 8:
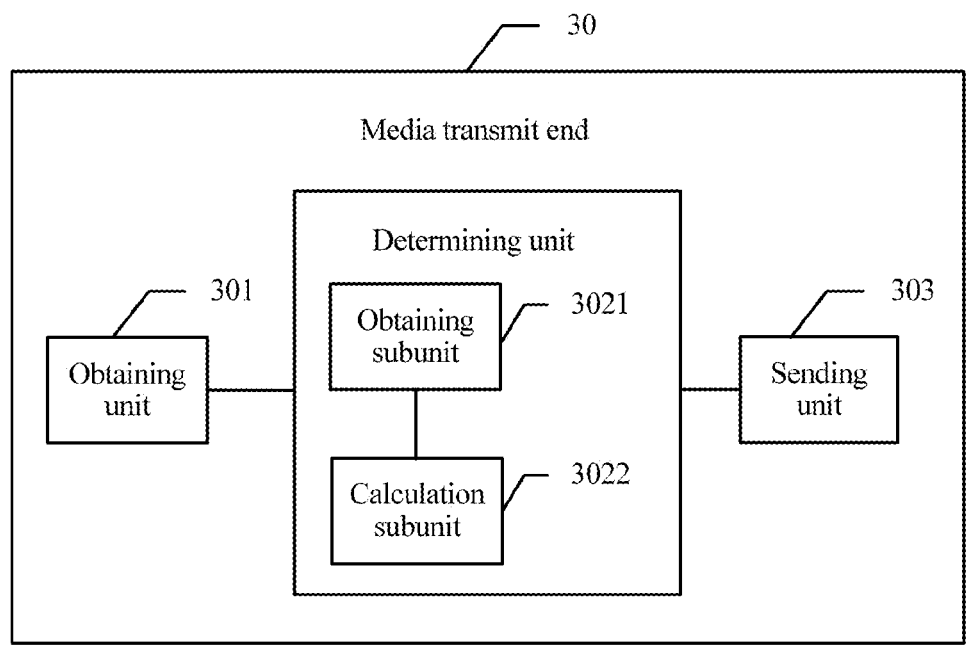
FIG. 8 is a schematic diagram of another embodiment of a media transmit end according to an embodiment of the present disclosure.

Optionally, on the basis of the third optional embodiment corresponding to FIG. 7, and referring to FIG. 8, in a fourth optional embodiment of the media transmit end 30 provided in the embodiments of the present disclosure, the determining unit 302 includes an obtaining subunit 3021 configured to obtain a weight of each media object in each piece of media content, and an association degree between each media object and another media object than the media object that are in same media content; and a calculation subunit 3022 configured to obtain, by means of calculation, the updating degree according to a preset updating degree calculation formula, and according to a weight and an association degree that are of a media object to which the changed media object attribute belongs, and a weight and an association degree that are of each media object in each piece of media content, where the weights and the association degrees are obtained by the obtaining subunit 3021.

Optionally, on the basis of the fourth optional embodiment corresponding to FIG. 8, in a fifth optional embodiment of the media transmit end provided in the embodiments of the present disclosure, the calculation subunit 3022 is configured to obtain the updating degree using a sum of products of the weights and the association degrees of the media objects to which the changed media object attribute belongs as a numerator factor, and using a sum of products of the weights and the association degrees that are of all media objects in each piece of media content as a denominator factor.

Optionally, on the basis of any embodiment of the foregoing embodiment, or the first to the fifth optional embodiments that are corresponding to FIG. 7, in a sixth optional embodiment of the media transmit end provided in the embodiments of the present disclosure, a media object attribute that is corresponding to the addition identifier and that is in the changed media object attribute is a newly added media object attribute; a media object attribute that is corresponding to the replacement identifier and that is in the changed media object attribute is a replaced media object attribute; and a media object attribute that is corresponding to the removal identifier and that is in the changed media object attribute is a to-be-removed media object attribute.

When the updating operation instruction includes the addition identifier, the first announcement message further carries location information of the newly added media object attribute, so that the media receive end adds the newly added media object attribute to a corresponding location according to the location information of the newly added media object attribute.

When the updating operation instruction includes the replacement identifier, the first announcement message further carries description information of the replaced media object attribute before updating, where the description information before updating is a media object attribute before updating or location information of the media object attribute before updating, so that the media receive end updates the replaced media object attribute into a corresponding location according to the media object attribute before updating or the location information of the media object attribute before updating.

When the updating operation instruction includes the removal identifier, the first announcement message further carries an association removal identifier, so that the media receive end removes, according to the association removal identifier, a media object attribute associated with the to-be-removed media object attribute.

For a processing process of the media transmit end or an interaction process between the media transmit end and the media receive end in this embodiment of the present disclosure, refer to the method embodiments in FIG. 1 to FIG. 5 for understanding, and details are not described herein again.

Figure 9:
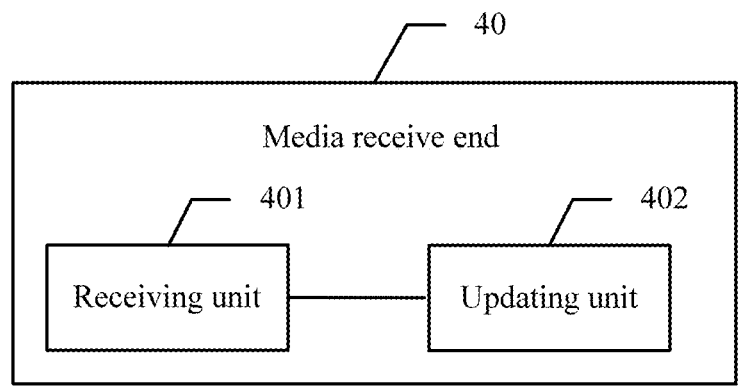
FIG. 9 is a schematic diagram of an embodiment of a media receive end according to an embodiment of the present disclosure.

Referring to FIG. 9, an embodiment of a media receive end 40 provided in the embodiments of the present disclosure includes the following: a receiving unit 401 configured to receive a first announcement message sent by a media transmit end, where the first announcement message includes an updating operation instruction and a changed media object attribute, where the changed media object attribute is obtained by the media transmit end when a media object attribute on a side of the media transmit end changes, and the updating operation instruction is determined by the media transmit end according to a change type of the changed media object attribute, where the media object attribute is included in a media object, and the media object is included in media content; and an updating unit 402 configured to update, according to the updating operation instruction and changed media content that are received by the receiving unit 401, media content that is on the side of the media transmit end and that is stored on a side of the media receive end 40.

In this embodiment of the present disclosure, a receiving unit 401 receives a first announcement message sent by a media transmit end, where the first announcement message includes an updating operation instruction and a changed media object attribute, where the changed media object attribute is obtained by the media transmit end when a media object attribute on a side of the media transmit end changes, and the updating operation instruction is determined by the media transmit end according to a change type of the changed media object attribute, where the media object attribute is included in a media object, and the media object is included in media content; and an updating unit 402 updates, according to the updating operation instruction and the changed media content that are received by the receiving unit 401, media content that is on the side of the media transmit end and that is stored on a side of the media receive end 40. Compared with the prior art in which all media content on the side of the media receive end 40 is updated each time, the media receive end provided in this embodiment of the present disclosure may update only changed media content according to an updating operation instruction, thereby improving an updating speed.

Figure 10:
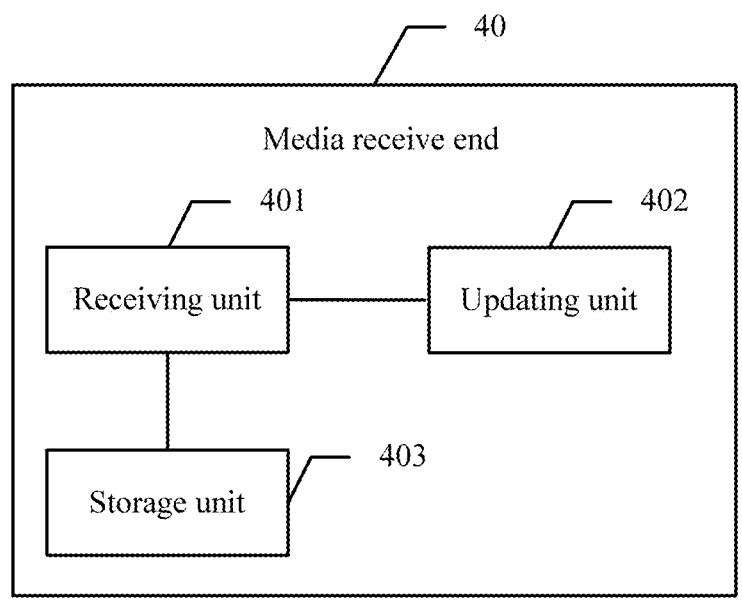
FIG. 10 is a schematic diagram of an embodiment of a media receive end according to an embodiment of the present disclosure.

Optionally, on the basis of the foregoing embodiment corresponding to FIG. 9, and referring to FIG. 10, in a first optional embodiment of the media receive end 40 provided in the embodiments of the present disclosure, the media receive end further includes a storage unit 403, where the receiving unit 401 is further configured to receive a second announcement message sent by the media transmit end, where the second announcement message carries all media content on the side of the media transmit end; and the storage unit 403 is configured to store all the media content that is on the side of the media transmit end and that is received by the receiving unit 401.

Optionally, on the basis of the foregoing embodiment or the first optional embodiment that are corresponding to FIG. 9, in a second optional embodiment of the media receive end 40 provided in the embodiments of the present disclosure, the updating operation instruction includes at least one of an addition identifier, a replacement identifier, or a removal identifier; the updating unit 402 is configured to, when the updating operation instruction includes the addition identifier, add, according to the addition identifier, a newly added media object attribute to the media object attribute stored on the side of the media receive end 40, where a media object attribute that is corresponding to the addition identifier and that is in the changed media object attribute is the newly added media object attribute; the updating unit 402 is configured to, when the updating operation instruction includes the replacement identifier, replace, according to the replacement identifier, a replaced media object attribute to the media object attribute stored on the side of the media receive end 40, where a media object attribute that is corresponding to the replacement identifier and that is in the changed media object attribute is the replaced media object attribute; and the updating unit 402 is configured to, when the updating operation instruction includes the removal identifier, remove, according to the removal identifier, a to-be-removed media object attribute from the media object attribute stored on the side of the media receive end 40, where a media object attribute that is corresponding to the removal identifier and that is in the changed media object attribute is the to-be-removed media object attribute.

The updating unit 402 is configured to, when the first announcement message further carries location information of the newly added media object attribute, add the newly added media object attribute to a corresponding location according to the location information of the newly added media object attribute.

The updating unit 402 is configured to, when the first announcement message further carries description information of the replaced media object attribute before updating, update the replaced media object attribute into a corresponding location according to a media object attribute before updating or location information of the media object attribute before updating, where the description information before updating is the media object attribute before updating or the location information of the media object attribute before updating.

The updating unit 402 is configured to, when the first announcement message further carries an association removal identifier, remove, according to the association removal identifier, a media object attribute associated with the to-be-removed media object attribute.

For a processing process of the media receive end or an interaction process between the media receive end and the media transmit end in this embodiment of the present disclosure, refer to the method embodiments in FIG. 1 to FIG. 5 for understanding, and details are not described herein again.

Figure 11:
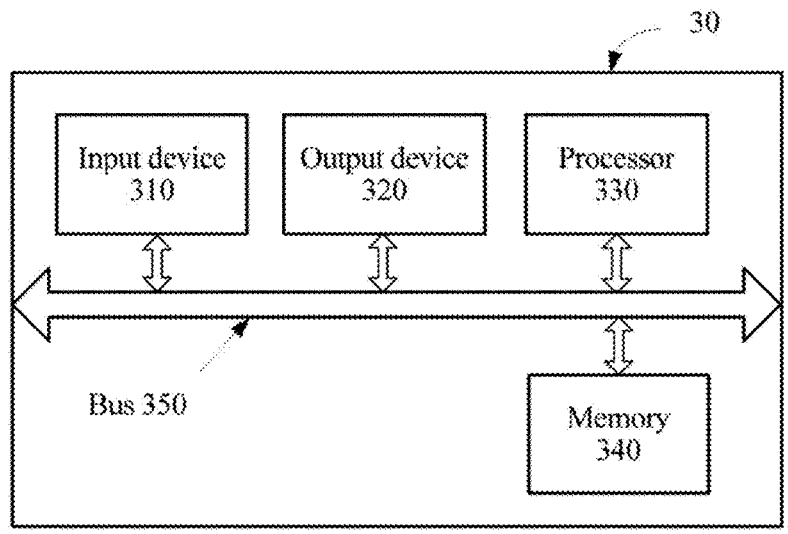
FIG. 11 is a schematic diagram of an embodiment of a media transmit end according to an embodiment of the present disclosure.

FIG. 11 is a schematic structural diagram of a media transmit end 30 according to an embodiment of the present disclosure. The media transmit end 30 may include an input device 310, an output device 320, a processor 330, and a memory 340.

The memory 340 may include a read-only memory and a random access memory, and provide an operating instruction and data to the processor 330. A part of the memory 340 may further include a nonvolatile random access memory (NVRAM).

The memory 340 stores the following elements: an executable module or a data structure, a subset thereof, or an extension set thereof.

Operating instructions include various operating instructions, which are used to implement various operations.

An operating system includes various system programs, which are used to implement various basic services and process hardware-based tasks.

In this embodiment of the present disclosure, the processor 330 executes the following operations by invoking an operating instruction stored in the memory 340 (the operating instruction may be stored in the operating system): obtaining a changed media object attribute on a side of the media transmit end 30, where the media object attribute is included in a media object, and the media objet is included in media content; determining an updating operation instruction for the changed media object attribute according to a change type of the changed media object attribute; and sending a first announcement message to a media receive end using the output device 320, where the first announcement message includes the updating operation instruction and the changed media object attribute, so that the media receive end updates, according to the updating operation instruction and the changed media object attribute, media content that is on the side of the media transmit end 30 and that is stored on a side of the media receive end.

In this embodiment of the present disclosure, when a media object attribute on a side of a media transmit end 30 changes, the media transmit end 30 adds only a changed media object attribute and an updating operation instruction for the changed media object attribute to an announcement message, so that a bandwidth occupancy rate can be reduced.

The processor 330 controls an operation of the media transmit end 30, and the processor 330 may also be referred to as a Central Processing Unit (CPU). The memory 340 may include a read-only memory and a random access memory, and provide an instruction and data to the processor 330. A part of the memory 340 may further include a NVRAM. In specific applications, all components of the media transmit end 30 are coupled together using a bus system 350, where the bus system 350 may further include a power bus, a control bus, a status signal bus, and the like in addition to a data bus. However, for clarity of description, various buses are marked as the bus system 350 in the figure.

The foregoing methods disclosed in the embodiments of the present disclosure may be applied to the processor 330, or implemented by the processor 330. The processor 330 may be an integrated circuit chip and has a signal processing capability. In an implementation process, the steps in the foregoing methods may be performed using a hardware integrated logical circuit or software-form instructions in the processor 330. The foregoing processor 330 may be a general purpose processor, a digital signal processor (DSP), an application-specific integrated circuit (ASIC), a field programmable gate array (FPGA) or another programmable logic device, a discrete gate or transistor logic device, or a discrete hardware component, and may implement or execute methods, steps, and logical block diagrams disclosed in the embodiments of the present disclosure. The general purpose processor may be a microprocessor or this processor may be any conventional processor, or the like. Steps of the methods disclosed with reference to the embodiments of the present disclosure may be directly executed and completed by means of a hardware decoding processor, or may be executed and completed using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 340. The processor 330 reads information in the memory 340, and completes the steps of the foregoing methods in combination with hardware of the processor 330.

Optionally, the output device 320 is further configured to send a second announcement message to the media receive end, where the second announcement message carries all media content on the side of the media transmit end 30, so that the media receive end stores all the media content on the side of the media transmit end 30.

Optionally, the processor 330 is further configured to determine a change amount of the changed media object attribute relative to changed media content on the side of the media transmit end 30, where the media content on the side of the media transmit end 30 includes one or more pieces of media content on the side of the media transmit end 30, each piece of media content includes multiple media objects, and each media object includes multiple media object attributes; and the output device 320 is configured to send the first announcement message to the media receive end when the change amount meets a preset condition.

Optionally, the processor 330 is configured to determine an updating degree of the changed media object attribute relative to the changed media content on the side of the media transmit end 30; and the output device 320 is configured to send the first announcement message to the media receive end when the updating degree falls within a preset updating interval.

Optionally, the processor 330 is configured to obtain a weight of each media object in each piece of media content, and an association degree between each media object and another media object than the media object that are in same media content; and obtain, by means of calculation, the updating degree according to a preset updating degree calculation formula, and according to a weight and an association degree that are of a media object to which the changed media object attribute belongs, and a weight and an association degree that are of each media object in each piece of media content.

Optionally, the processor 330 is configured to obtain the updating degree using a sum of products of the weights and the association degrees of media objects to which the changed media object attribute belongs as a numerator factor, and using a sum of products of the weights and the association degrees that are of all media objects in each piece of media content as a denominator factor.

The updating operation instruction includes at least one of an addition identifier, a replacement identifier, or a removal identifier.

A media object attribute that is corresponding to the addition identifier and that is in the changed media object attribute is a newly added media object attribute.

A media object attribute that is corresponding to the replacement identifier and that is in the changed media object attribute is a replaced media object attribute.

A media object attribute that is corresponding to the removal identifier and that is in the changed media object attribute is a to-be-removed media object attribute.

When the updating operation instruction includes the addition identifier, the first announcement message further carries location information of the newly added media object attribute, so that the media receive end adds the newly added media object attribute to a corresponding location according to the location information of the newly added media object attribute.

When the updating operation instruction includes the replacement identifier, the first announcement message further carries description information of the replaced media object attribute before updating, where the description information before updating is a media object attribute before updating or location information of the media object attribute before updating, so that the media receive end updates the replaced media object attribute into a corresponding location according to the media object attribute before updating or the location information of the media object attribute before updating.

When the updating operation instruction includes the removal identifier, the first announcement message further carries an association removal identifier, so that the media receive end removes, according to the association removal identifier, a media object attribute associated with the to-be-removed media object attribute.

Figure 12:
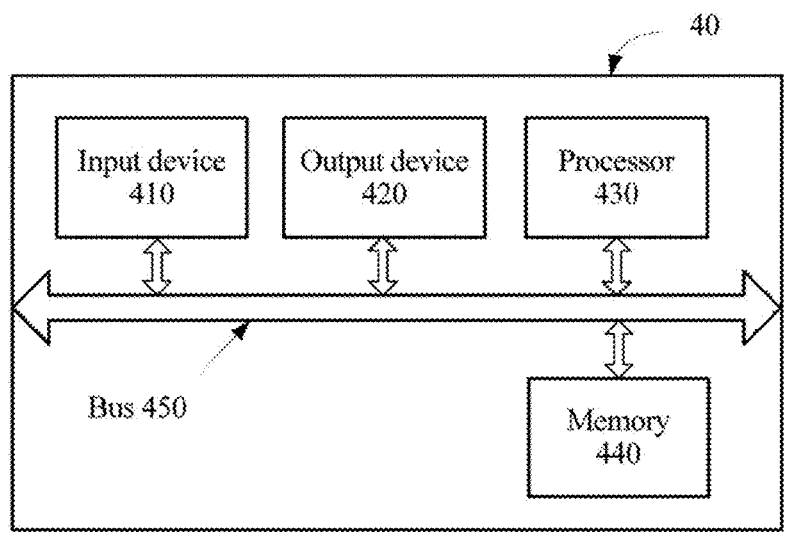
FIG. 12 is a schematic diagram of another embodiment of a media receive end according to an embodiment of the present disclosure.

FIG. 12 is a schematic structural diagram of a media receive end 40 according to an embodiment of the present disclosure. The media receive end 40 may include an input device 410, an output device 420, a processor 430, and a memory 440.

The memory 440 may include a read-only memory and a random access memory, and provide an instruction and data to the processor 430. A part of the memory 440 may further include a NVRAM.

The memory 440 stores the following elements: an executable module or a data structure, a subset thereof, or an extension set thereof.

Operating instructions include various operating instructions, which are used to implement various operations.

An operating system includes various system programs, which are used to implement various basic services and process hardware-based tasks.

In this embodiment of the present disclosure, the processor 430 executes the following operations by invoking an operating instruction stored in the memory 440 (the operating instruction may be stored in the operating system): receiving, using an input device 410, a first announcement message sent by a media transmit end, where the first announcement message includes an updating operation instruction and a changed media object attribute, where the changed media object attribute is obtained by the media transmit end when a media object attribute on a side of the media transmit end changes, and the updating operation instruction is determined by the media transmit end according to a change type of the changed media object attribute, where the media object attribute is included in a media object, and the media object is included in media content.

The processor 430 is configured to update, according to the updating operation instruction and the changed media object attribute, media content that is on the side of the media transmit end and that is stored on a side of the media receive end 40.

In this embodiment of the present disclosure, the media receive end 40 may update only the changed media object attribute according to the updating operation instruction, thereby improving an updating speed.

The processor 430 controls an operation of the media receive end 40, and the processor 430 may also be referred to as a CPU. The memory 440 may include a read-only memory and a random access memory, and provide an instruction and data to the processor 430. A part of the memory 440 may further include a NVRAM. In specific applications, all components of the media receive end 40 are coupled together using a bus system 450, where the bus system 450 may further include a power bus, a control bus, a status signal bus, and the like in addition to a data bus. However, for clarity of description, various buses are marked as the bus system 450 in the figure.

The foregoing methods disclosed in the embodiments of the present disclosure may be applied to the processor 430, or implemented by the processor 430. The processor 430 may be an integrated circuit chip and has a signal processing capability. In an implementation process, the steps in the foregoing methods may be performed using a hardware integrated logical circuit or software-form instructions in the processor 430. The foregoing processor 430 may be a general purpose processor, a DSP, an ASIC, a FPGA or another programmable logic device, a discrete gate or transistor logic device, or a discrete hardware component, and may implement or execute methods, steps, and logical block diagrams disclosed in the embodiments of the present disclosure. The general purpose processor may be a microprocessor or this processor may be any conventional processor, or the like. Steps of the methods disclosed with reference to the embodiments of the present disclosure may be directly executed and completed by means of a hardware decoding processor, or may be executed and completed using a combination of hardware and software modules in a decoding processor. The software module may be located in a mature storage medium in the field, such as a random access memory, a flash memory, a read-only memory, a programmable read-only memory, an electrically-erasable programmable memory, or a register. The storage medium is located in the memory 440. The processor 430 reads information in the memory 440, and completes the steps of the foregoing methods in combination with hardware of the processor 430.

Optionally, the input device 410 is further configured to receive a second announcement message sent by the media transmit end, where the second announcement message carries all media content on the side of the media transmit end; and the memory 440 is configured to store all the media content on the side of the media transmit end.

Optionally, the updating operation instruction includes at least one of an addition identifier, a replacement identifier, or a removal identifier; the processor 430 is configured to, when the updating operation instruction includes the addition identifier, add, according to the addition identifier, a newly added media object attribute to the media object attribute stored on the side of the media receive end 40, where a media object attribute that is corresponding to the addition identifier and that is in the changed media object attribute is the newly added media object attribute; the processor 430 is configured to, when the updating operation instruction includes the replacement identifier, replace, according to the replacement identifier, a replaced media object attribute to the media object attribute stored on the side of the media receive end 40, where a media object attribute that is corresponding to the replacement identifier and that is in the changed media object attribute is the replaced media object attribute; and the processor 430 is configured to, when the updating operation instruction includes the removal identifier, remove, according to the removal identifier, a to-be-removed media object attribute from the media object attribute stored on the side of the media receive end 40, where a media object attribute that is corresponding to the removal identifier and that is in the changed media object attribute is the to-be-removed media object attribute.

The processor 430 is configured to, when the first announcement message further carries location information of the newly added media object attribute, add the newly added media object attribute to a corresponding location according to the location information of the newly added media object attribute.

The processor 430 is configured to, when the first announcement message further carries description information of the replaced media object attribute before updating, update the replaced media object attribute into a corresponding location according to a media object attribute before updating or location information of the media object attribute before updating, where the description information before updating is the media object attribute before updating or the location information of the media object attribute before updating.

The processor 430 is configured to, when the first announcement message further carries an association removal identifier, remove, according to the association removal identifier, a media object attribute associated with the to-be-removed media object attribute.

Figure 13:
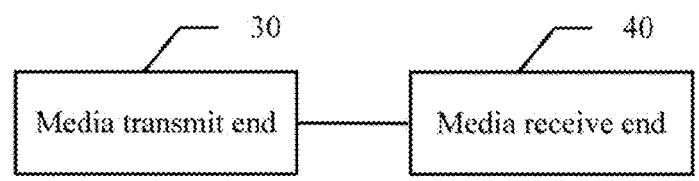
FIG. 13 is a schematic diagram of an embodiment of a media content updating system according to an embodiment of the present disclosure.

Referring to FIG. 13, an embodiment of a media content updating system provided in the embodiments of the present disclosure includes a media transmit end 30 and a media receive end 40.

The media transmit end 30 is configured to obtain a changed media object attribute on a side of the media transmit end 30, where the media object attribute is included in a media object, and the media object is included in media content; determine an updating operation instruction for the changed media object attribute according to a change type of the changed media object attribute; and send a first announcement message to a media receive end 40, where the first announcement message includes the updating operation instruction and the changed media object attribute, so that the media receive end 40 updates, according to the updating operation instruction and the changed media object attribute, media content that is on the side of the media transmit end 30 and that is stored on a side of the media receive end 40.

The media receive end 40 is configured to receive the first announcement message sent by the media transmit end 30, and update, according to the updating operation instruction and the changed media object attribute, the media content that is on the side of the media transmit end 30 and that is stored on the side of the media receive end 40.

The media transmit end and the media receive end that are in the media content updating system provided in the present disclosure may be the media transmit end and the media receive end that are in the foregoing apparatus embodiments. It may be understood that all functions of the media transmit end and the media receive end that are in the foregoing apparatus embodiments may be implemented in the system of the present disclosure. For specific functions of the media transmit end and the media receive end, refer to the apparatus embodiments for understanding, and details are not described herein again.

In this embodiment of the present disclosure, when media content on a side of a media transmit end changes, the media transmit end adds only changed media content and an updating operation instruction for a changed media object attribute to an announcement message, so that a bandwidth occupancy rate can be reduced. A media receive end may also update media content on a side of the media receive end according to the updating operation instruction and the changed media object attribute, without updating all media content, which improves an updating speed.

Persons of ordinary skill in the art may understand that all or some of the steps of the methods in the embodiments may be implemented by a program instructing relevant hardware (such as a processor). The program may be stored in a computer readable storage medium. The storage medium may include a read-only memory (ROM), a random access memory (RAM), a magnetic disk, an optical disc, or the like.

The media content updating method, apparatus, and system provided in the embodiments of the present disclosure are described above in detail. In this specification, specific examples are used to illustrate the principle and implementation manners of the present disclosure, and the foregoing description of the embodiments is intended only to help understand the method and core idea of the present disclosure. In addition, persons of ordinary skill in the art can make variations and modifications to the present disclosure in terms of the specific implementation manners and application scopes according to the ideas of the present disclosure. Therefore, the content of this specification shall not be construed as a limitation on the present disclosure.

What is claimed is:

1. A media content updating method, comprising:
obtaining, by a media transmit end, a first changed media object attribute and a second changed media object attribute on a side of the media transmit end, wherein the first and the second media object attributes are comprised in a media object, and the media object is comprised in media content, and wherein an updating operation instruction for the first changed media object attribute and the second changed media object attribute is determined by the media transmit end according to a change type of the changed media object attribute;
determining a change amount of the first changed media object attribute relative to changed media content on the side of the media transmit end;
determining a change amount of the second changed media object attribute relative to changed media content on the side of the media transmit end; wherein the media content on the side of the media transmit end comprises one or more pieces of media content on the side of the media transmit end, wherein each piece of media content comprises multiple media objects, wherein each media object comprises multiple media object attributes; and
sending, by the media transmit end, a first announcement message to a media receive end in response to the change amount meets a preset condition, wherein the first announcement message comprises the updating operation instruction, the first changed media object attribute, and the second changed media object attribute, such that the media receive end updates, according to the updating operation instruction, the first changed media object attribute, and the second changed media object attribute, media content that is on the side of the media transmit end and that is stored on a side of the media receive end.

2. The method according to claim 1, wherein before sending, by the media transmit end, the first announcement message to the media receive end, the method further comprises sending, by the media transmit end, a second announcement message to the media receive end, and wherein the second announcement message carries all media content on the side of the media transmit end, such that the media receive end stores all the media content on the side of the media transmit end.

3. The method according to claim 1, wherein determining the change amount of the first changed media object attribute relative to changed media content on the side of the media transmit end comprises determining an updating degree of the first changed media object attribute relative to the changed media content on the side of the media transmit end, and wherein sending the first announcement message to the media receive end when the change amount meets a preset condition comprises sending the first announcement message to the media receive end when the updating degree falls within a preset updating interval.

4. The method according to claim 3, wherein determining the updating degree of the first changed media object attribute relative to the changed media content on the side of the media transmit end comprises:
   obtaining a weight of each media object in each piece of media content, and an association degree between each media object and another media object than the media object that are in same media content; and
   obtaining, by calculating, the updating degree according to a preset updating degree calculation formula, and according to a weight and an association degree that are of a media object to which the first changed media object attribute belongs, and a weight and an association degree that are of each media object in each piece of media content.

5. The method according to claim 4, wherein obtaining, by calculating, the updating degree according to the preset updating degree calculation formula, and according to the weight and the association degree that are of the media object to which the first changed media object attribute belongs, and the weight and the association degree that are of each media object in each piece of media content comprises:
   obtaining the updating degree using a sum of products of the weights and the association degrees that are of the media objects to which the first changed media object attribute belongs as a numerator factor; and
   using a sum of products of the weights and the association degrees that are of all media objects in each piece of media content as a denominator factor.

6. The method according to claim 1, wherein the updating operation instruction comprises an addition identifier, wherein a media object attribute that is corresponding to the addition identifier and that is in the first changed media object attribute is a newly added media object attribute, and wherein the first announcement message further carries location information of the newly added media object attribute, such that the media receive end adds the newly added media object attribute to a corresponding location according to the location information of the newly added media object attribute.

7. The method according to claim 1, wherein when the updating operation instruction comprises a replacement identifier, wherein a media object attribute that is corresponding to the replacement identifier and that is in the first changed media object attribute is a replaced media object attribute, the first announcement message further carries description information of the replaced media object attribute before updating, and wherein the description information before updating is a media object attribute before updating or location information of the media object attribute before updating, such that the media receive end updates the replaced media object attribute into a corresponding location according to the media object attribute before updating or the location information of the media object attribute before updating.

8. The method according to claim 1, wherein when the updating operation instruction comprises a removal identifier, and wherein a media object attribute that is corresponding to the removal identifier and that is in the first changed media object attribute is a to-be-removed media object attribute, the first announcement message further carries an association removal identifier, such that the media receive end removes, according to the association removal identifier, a media object attribute associated with the to-be-removed media object attribute.

9. A media transmit end, comprising:
   a non-transitory computer readable medium having a plurality of computer readable instructions stored thereon; and
   a processor coupled to the computer readable medium, the computer readable instructions configured to be executed in the processor and comprising instructions for:
      obtaining a first changed media object attribute and a second changed media object attribute on a side of the media transmit end, wherein the media object attribute is comprised in a media object, and the media object are comprised in media content, and wherein an updating operation instruction for the first changed media object attribute and the second changed media object attribute is determined by the media transmit end according to a change type of the changed media object attribute;
      determining a change amount of the first changed media object attribute relative to changed media content on the side of the media transmit end;
      determining a change amount of the second changed media object attribute relative to changed media content on the side of the media transmit end, wherein the media content on the side of the media transmit end comprises one or more pieces of media content on the side of the media transmit end, wherein each piece of media content comprises multiple media objects, and wherein each media object comprises multiple media object attributes; and
      sending a first announcement message to a media receive end in response to the change amount meets a preset condition, wherein the first announcement message comprises the updating operation instruction, the first changed media object attribute, and the second changed media object attribute, such that the media receive end updates, according to the updating operation instruction, first changed media object attribute, and the second changed media object attribute, media content that is on the side of the media transmit end and that is stored on a side of the media receive end.

10. The media transmit end according to claim 9, wherein the computer readable instructions comprises further instructions for before sending the first announcement message to the media receive end, sending a second announcement message to the media receive end, and wherein the second announcement message carries all media content on the side of the media transmit end, such that the media receive end stores all the media content on the side of the media transmit end.

11. The media transmit end according to claim 9, wherein the computer readable instructions comprises further instructions for:

determining an updating degree of the first changed media object attribute relative to the changed media content on the side of the media transmit end; and sending the first announcement message to the media receive end when the updating degree falls within a preset updating interval.

12. The media transmit end according to claim 11, wherein the computer readable instructions comprises further instructions for:

obtaining a weight of each media object in each piece of media content, and an association degree between each media object and another media object than the media object that are in same media content; and obtaining, by calculating, the updating degree according to a preset updating degree calculation formula, and according to a weight and an association degree that are of a media object to which the first changed media object attribute belongs, and a weight and an association degree that are of each media object in each piece of media content.

13. The media transmit end according to claim 12, wherein the computer readable instructions comprises further instructions for:

obtaining the updating degree using a sum of products of the weights and the association degrees that are of the media objects to which the first changed media object attribute belongs as a numerator factor; and using a sum of products of the weights and the association degrees that are of all media objects in each piece of media content as a denominator factor.

14. A media receive end, comprising:

a non-transitory computer readable medium having a plurality of computer readable instructions stored thereon; and a processor coupled to the computer readable medium, the computer readable instructions configured to be executed in the processor and comprising instructions for:

receiving a first announcement message sent by a media transmit end, wherein the first announcement message comprises an updating operation instruction and a first changed media object attribute and a second changed media object attribute, wherein the first and second changed media object attribute are obtained by the media transmit end when a media object attribute on a side of the media transmit end changes, and the updating operation instruction is determined by the media transmit end according to a change type of the first changed media object attribute and the second changed media object attribute, and wherein the first changed media object attribute and the second changed media object attribute are comprised in a media object, and the media object is comprised in media content;

updating media content stored on a side of the media receive end according to the updating operation instruction and the first changed media object attribute and the second changed media object attribute; and adding the newly added media object attribute to a corresponding location according to location information of the newly added media object attribute when the first announcement message further carries the location information of the newly added media object attribute.

15. The media receive end according to claim 14, wherein the media receive end further comprises a storage unit, wherein the computer readable instructions comprises further instructions for receiving a second announcement message sent by the media transmit end, wherein the second announcement message carries all media content on the side of the media transmit end, and wherein the storage unit is configured to store all the media content that is on the side of the media transmit end.

16. The media receive end according to claim 14, wherein the updating operation instruction comprises at least one of an addition identifier, a replacement identifier, or a removal identifier, wherein the computer readable instructions comprises further instructions for:

adding, according to the addition identifier, a newly added media object attribute to the media object attribute stored on the side of the media receive end when the updating operation instruction comprises the addition identifier, wherein a media object attribute that is corresponding to the addition identifier and that is in the first changed media object attribute is the newly added media object attribute;

replacing, according to the replacement identifier, a replaced media object attribute to the media object attribute stored on the side of the media receive end when the updating operation instruction comprises the replacement identifier, wherein a media object attribute that is corresponding to the replacement identifier and that is in the first changed media object attribute is the replaced media object attribute; and removing, according to the removal identifier, a to-be-removed media object attribute from the media object attribute stored on the side of the media receive end when the updating operation instruction comprises the removal identifier, wherein a media object attribute that is corresponding to the removal identifier and that is in the first changed media object attribute is the to-be-removed media object attribute.

17. The media receive end according to claim 16, wherein the computer readable instructions comprises further instructions for updating the replaced media object attribute into a corresponding location according to a media object attribute before updating or location information of the media object attribute before updating when the first announcement message further carries description information of the replaced media object attribute before updating, and wherein the description information before updating is the media object attribute before updating or the location information of the media object attribute before updating.

* * * * *